United States Patent [19]

Croes et al.

[11] Patent Number: 4,827,447

[45] Date of Patent: May 2, 1989

[54] METHOD FOR SELECTIVELY RETURNING TO THE BEGINNING OR THE PREVIOUS REVISION POINT IN DOCUMENT EDITION

[75] Inventors: Rosimbo E. Croes, Austin; Alice V. Gentry; Milton L. Gentry, Jr., both of Leander; Melvin R. Kendrick, Round Rock, all of Tex.

[73] Assignee: International Business Machines Corporation, Armonk, N.Y.

[21] Appl. No.: 873,756

[22] Filed: Jun. 13, 1986

[51] Int. Cl.[4] .................... G06F 3/14; G06F 15/00
[52] U.S. Cl. ........................... 364/900; 400/63
[58] Field of Search ... 364/200 MS File, 900 MS File, 364/518; 400/63, 76

[56] References Cited

U.S. PATENT DOCUMENTS

| | | | |
|---|---|---|---|
| 4,252,451 | 2/1981 | Clancy et al. | 400/279 |
| 4,414,628 | 11/1983 | Ahuja et al. | 364/200 |
| 4,425,629 | 1/1984 | Cason et al. | 364/900 |
| 4,429,372 | 1/1984 | Berry et al. | 364/900 |
| 4,498,148 | 2/1985 | Baker et al. | 364/900 |
| 4,557,615 | 12/1985 | Ueno | 400/54 |
| 4,559,598 | 12/1985 | Goldwasser et al. | 364/900 |
| 4,564,301 | 1/1986 | Ueno | 400/63 |
| 4,586,156 | 4/1986 | Kurata et al. | 364/900 |
| 4,633,432 | 12/1986 | Kitamura | 364/900 |
| 4,686,649 | 8/1987 | Rush et al. | 364/200 |
| 4,717,911 | 1/1988 | Matsuwa et al. | 340/72 X |

FOREIGN PATENT DOCUMENTS

| | | |
|---|---|---|
| 136710 | 4/1985 | European Pat. Off. |
| 59-160241 | 9/1984 | Japan |
| 60-19251 | 1/1985 | Japan |
| 60-074056 | 4/1985 | Japan |
| 2151381 | 7/1985 | United Kingdom |

OTHER PUBLICATIONS

Chang et al, "OCR/Visual Editing System", *IBM TDB vol. 21, No. 2, Jul. 1978, pp. 718–719.*
*Lotus 1-2-3 User's Manual*, Lotus Development Corporation, 1983, pp. 169–180.
*Office System 6 Visual Instruction Program, IBM Information Processors Reference Book*, IBM Corporation, 1979, pp. 5-94–5-95.
*International Technology Disclosures* 88403 (Anonymous Publication), "Automated Thesaurus For Temporary Replacement of Synonyms", (Aug. 25, 1984).

*Primary Examiner*—Raulfe B. Zache
*Assistant Examiner*—Thomas C. Lee
*Attorney, Agent, or Firm*—Douglas H. Lefeve

[57] ABSTRACT

Upon termination of the editing of a document, the editing program saves a pointer in the document which contains the location of the character or control at the cursor location when editing was terminated. Then, when editing of the document is resumed, the operator has the option to return to this saved, last revision point location or instead, to the beginning of the document as has been the case with prior art editors. The pointer to the last edit location is saved with the document itself, on the storage media, so that any operator using any copy of the editor with which the document is compatible, can return on any document to the last revision location regardless of the number of intervening documents which have been edited.

6 Claims, 11 Drawing Sheets

```
Create Document                                    |Ins |         |Pg 1
DIR/MEMO.DCC                                       |Typestyle 26 (10p)|Ln 7

F2=End/Save  F4=Edit  F5=Functions  F6=Search  F7=Format  F9=Graphics
<....2........3.......4....V....5........6........7........8........>....9
A separate enrollment form must be completed for each
subject and forwarded to the Employee and Management Edit Options Display Graphics......[Y]    Y = Yes           N = No
  Display All Codes.....[N]    Y = Yes           N = No Auto Carrier Return...[Y]    Y = Yes           N = No
  Auto Page End.........[Y]    Y = Yes           N = No Return to Paper Clip..[Y]    Y = Yes           N = No
  Keyboard Extension....[1]    1 = Symbols-Set 1    2 = Symbols-Set 2
                               3 = Characters-Set 3 4 = Characters-Set 4

Overstrike Character..[/]    (Any Character)
  Notepad Choice........[S]    S = System Notepad    U = User-Named Notepads Enter   Esc=Quit   F1=Help
```

FIG. 7

```
Create Profile          | User Profile
PROFILE.PRF
```

```
                          Edit Defaults

Edit Copy of Document..[Y]   Y = Yes              N = No

Edit Options:
  Display Graphics......[Y]   Y = Yes             N = No
  Auto Carrier Return...[Y]   Y = Yes             N = No
  Auto Page End.........[Y]   Y = Yes             N = No
  Return to Paper Clip..[Y]   Y = Yes             N = No
  Overstrike Character..[/]   (Any Character)
  Notepad Choice........[S]   S = System Notepad
                              U = User-named Notepad Search/Replace Options:
  Type of Replace.......[P]   P = Prompted        A = Automatic
  Type of Match.........[E]   W = Word            E = Exact Character Enter    Esc=Quit    F1=Help
```

FIG. 8

METHOD FOR SELECTIVELY RETURNING TO THE BEGINNING OR THE PREVIOUS REVISION POINT IN DOCUMENT EDITION

TECHNICAL FIELD

This invention relates to document editing in general and more particularly to automated techniques for returning to a previous revision point of a document for continuing the editing of that document.

BACKGROUND ART

For several decades automated systems have existed to aid in the creation and revision of documents. One example of such a system in the late 1950's and early 1960's was called a power typing system and allowed the storage of an alphanumeric text document on a punched paper tape or magnetic tape. Editing with such a system involved use of the machine to punch a new paper tape or make a new recording of the same or another magnetic tape to result in a revised form of the document. Such systems have evolved from very expensive, hard to use, substantially purely electromechanical machines to the present day personal computers which, when programmed with any of a variety of easy to learn, flexible software products, enable relative beginners to create and revise documents of impressive presentation quality.

When one ends the task of revising a document, depending on the facts and circumstances surrounding the job, in some instances it is highly advantageous to return to the beginning of the document at the start of the next succeeding revision on the document. At other times, however, and particularly if no actual revision of the document will take place until the point is reached in the document where revision was ended during the last revision pass, it would be more advantageous to return to point in the document at which the previous editing session ended, rather than returning to the beginning of the document. For an example of the later situation consider a scenario in which one has worked halfway through page 15 during the revision of a 30 page document when it is necessary to end the revision of the document at this point to pursue another task with the computer system of more immediate urgency. When the operator is able to return to the revision of this document, the earliest point in the document at which any revision will occur is at the point at which the previous revision session was ended, which is halfway down page 15 of the 30 page document. In this situation, it will be understood that a function or facility to return to the point of previous revision would have great utility.

On the other hand, when a user finishes a revision session at the end of a document, it would be of little use, and in fact a nuisance, for the next subsequent revision session to automatically enter the document at the end of the document.

A number of prior word processing systems have attempted to address this problem. One such word processing system allowed a return in the document to the beginning of the page on which the previous revision session ended. This approach was useful in most cases in which the document had already been divided into pages; however, in a great number of instances documents may be created and have several revisions performed thereon as a single, very large page, rather than as a series of shorter pages. Thus, in this prior art system, a return to the page on which the last revision took place is often a return to the beginning of the document.

With another prior art technique related to a spreadsheet, it was possible to have the revision point return to the cell which was being edited at the conclusion of the previous pass, but in this case, to the end of the cell which was last edited. With both this technique and the one described immediately above, if the last, previous revision point happened to be the beginning of the page (first example) or at the end of the spreadsheet cell (second example) then editing did return to where it was previously ended. However, if editing previously ended somewhere other than at the beginning of a page or at the end of the spreadsheet cell, then editing did not return to the last previous edit point in the document. Thus, the shortcoming with both of these approaches wa that editing could not be guaranteed to return to the smallest revisable entity in the document.

With another prior art technique a pointer was kept, in the random access memory of the programmed computer system, of an address point where revision most recently took place in the most recently edited document. This approach was useful in those instances in which an operator suspended revision to perform another type of computer task and returned to revision of the document before other documents were revised or electrical power to the system was interrupted. In the event that a second job were revised between suspension of revision of the first job and return of the revision thereto, the most recent revision point of the second job would overwrite the most recent revision point of the first job in the random access memory and render a return to the last revision point in the first job impossible. It will further be understood that interruption of the system power, such as by turning the system off at the end of the day, will also destroy the pointer to the revision location saved in the random access memory. For that matter, if the system is for any reason reinitialized or IPL'ed (initial program loaded) without the interruption of power, the memory contents will obviously be lost.

As a refinement to the technique of saving the most recent revision location in the system random access memory, another technique has been to record this revision address on the media which stores the word processing program, in association with the word processing program, itself. This overcomes the problems that occur when the power is interrupted or the system is IPL'ed but does not overcome the problem of having an intervening document revised, because only the most recent revision address of the most recently revised document is recorded on the storage media with the word processing program. An additional shortcoming of this third technique arises when the revision of a document is transferred from one operator to another. Typically, each operator has associated with his or her computer system a separate word processing program which is not transferred from operator to operator. Thus, assuming only the document were transferred and not the word processing programs themselves, the point of most recent revision of the document transferred from one operator to another for editing would not be readily available to the second operator.

In view of this, it will be understood that the provision of a technique for selectively returning to the smallest revisable entity of the most recent revision of a document, in a manner which allows the document to be transferred from one user to another and is not dependent on the volatile memory of the computer system used for revision, would add greatly to the power and flexibility of any system capable of document revision.

SUMMARY OF THE INVENTION

Accordingly, with the present invention whenever editing of a document with an application program is terminated, the program saves a pointer to the current cursor location as a part of the document being edited. Then, when editing of the document is resumed, the operator has the option to return to this saved, last revision point location. If this option is selected by the operator, the document will automatically be presented to the operator with the cursor at the last edit location without any further operator action.

Saving the pointer to the last edit location with the document itself, on the storage media, allows three important advantages. First, the system can return to this last revision point even if the system has been powered down or otherwise IPL'ed after the last time editing was completed on the document. Second, since the pointer is not saved as part of the editor itself, any number of documents can be edited any number of times and in any order. If the "return to last revision point" option is selected, the system will return to the last revision point for each document. Third, the document can be transferred to another operator for continuation of revision. If the "return to last revision point" option is selected by the second operator, the system will return to the point where the first operator stopped revision.

The term "revision", "first revision", or "previous revision" encompasses the initial creation or keying of a document as well as additional revision passes. Thus, this invention is also applicable to returning to the character or control at which the creation of a document is suspended during the process of originally creating the document.

An application program which uses this technique and allows for operator selected default settings in a profile related to system operation can include an operator selected default setting relating to the choice of returning to the last revision point or returning to the beginning of the document on each subsequent revision. Such an application may be configured to allow the operator, on a document by document basis, to override this default profile setting.

The foregoing and other objects, features, extensions, and advantages of the invention will be apparent from the following more particular description of preferred embodiments of the invention, as illustrated in the accompanying drawings.

BEST MODE FOR CARRYING OUT THE INVENTION

Figure 1:
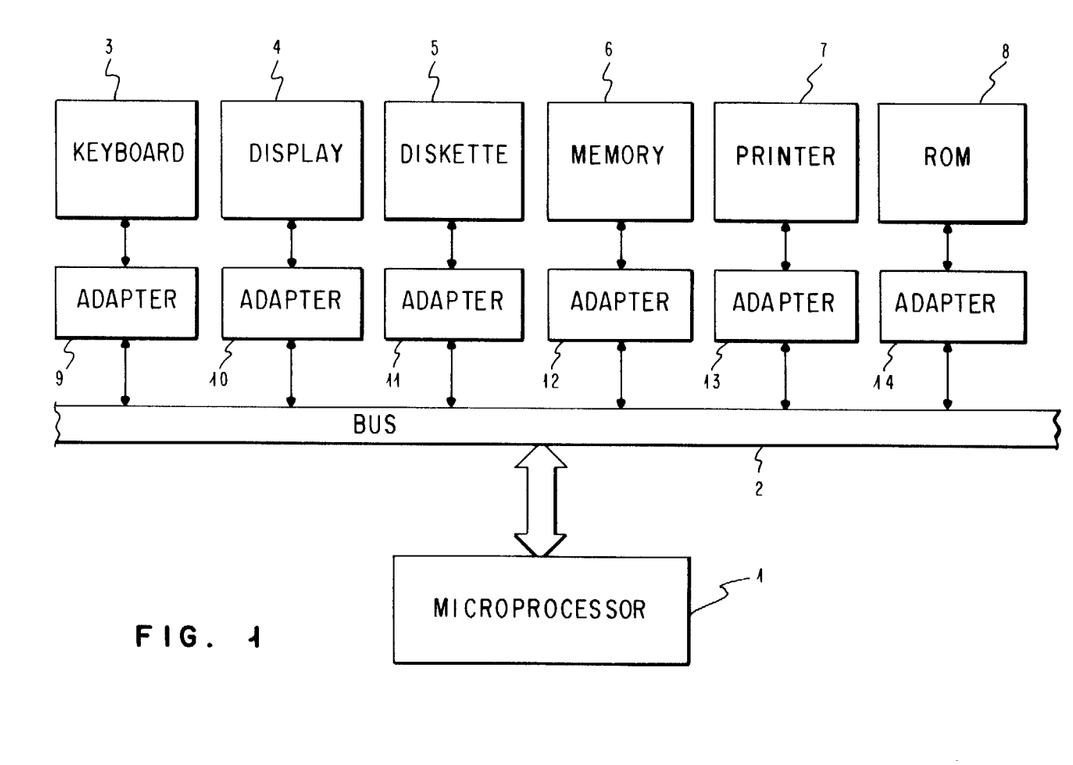
FIG. 1 is a block diagram of a data processing system which includes a stored program for performing word processing functions including the functions of this invention.

Beginning with reference to the block diagram of FIG. 1, a typical personal computer architecture is shown, such as the configuration used in the IBM Personal Computer. The focal point of this architecture comprises a microprocessor 1 which may, for example, be an Intel 8088 or similar microprocessor. The microprocessor 1 is connected to a bus 2 which comprises a set of data lines, a set of address lines and a set of control lines. A plurality of I/O devices or memory or storage devices 3–8 are connected to the bus 2 through separate adapters 9–14, respectively. For example, the display 4 may be the IBM Personal Computer Color Display and the adapter 10 may, accordingly, be the IBM Color/Graphics Adapter. The other devices 3 and 5–8 and adapters 9 and 11–14 are either included as part of an IBM Personal Computer or are available as plug-in options from the IBM Corporation. For example, the random access memory 6 and the read-only memory 8 and their corresponding adapters 12–14 are included as standard equipment in the IBM Personal Computer, although additional random access memory to supplement memory 6 may be added via a plug-in memory expansion option.

Within the read-only memory 8 are stored a plurality of instructions, known as the basic input/output operating system, or BIOS, for execution by the microprocessor 1. The BIOS controls the fundamental operations of the computer. An operating system such as the IBM Personal Computer Series Disk Operating System by Microsoft Corporation, or DOS, most commonly used with the IBM Personal Computer family, is loaded into the memory 6 and runs in conjunction with the BIOS stored in the ROM 8. It will be understood by those skilled in the art that the personal computer system could be configured so that parts or all of the BIOS are stored in the memory 6 rather than in the ROM 8 so as to allow modifications to the basic system operations by changes made to the BIOS program, which would then be readily loadable into the random access memory 6.

An application program such as the IBM DisplayWrite 3 word processing program may also be loaded into the memory 6 to provide instructions to the microprocessor 1 to enable a comprehensive set of word processing tasks, including the creation and revision of text documents, to be performed by the personal computer system shown in FIG. 1. An application program loaded into the memory 6 is said to run in conjunction with the disk operating system previously loaded into the memory 6.

For the purposes of the remaining description of this invention the Text Storage Buffer (TSB) refers to a computer system random access memory (RAM) buffer that contains the page or part of the page of the document being edited. Records from the edited document are read into this buffer from storage media and modified records are written to the storage media from this buffer. The Text Storage Buffer Manager (TSB Manager) is the service used by an application program to perform basic editing functions such as the delete, insert, and cursor movement functions provided by the IBM DisplayWrite 3 word processing program. This service also handles the transfer of data records from the TSB to and from the media as is well known by those skilled in the art.

The "paper clip", or last revision location, is a pointer to a specific character or control in a document. This pointer contains information for the character or control associated with the cursor location as follows: (1) the number of the page which contains the character or control, (2) the number of the record within the document which contains the character or control, (3) the offset within the record to the character or control, and (4) status flags. If the character or control is still within the TSB (that is, has not yet been transferred to the storage media) the pointer information simply consists of the offset within the TSB to the character or control and the status flags.

The "paper clip" must be stored with the document being created or edited, although the choice of where to store this pointer with the document is a matter of the designer's choice. For example, the pointer may be stored along with a block of format information that always accompanies each document. Alternatively, the pointer may be imbedded at some point in the text data stream provided that it is bounded by the appropriate control codes to separate it from the other document text or controls. As another alternative, the "paper clip" may be stored as a portion of information or data pertaining to a non-text object in a composite document including text and other non-text objects such as graphics.

Figure 2:
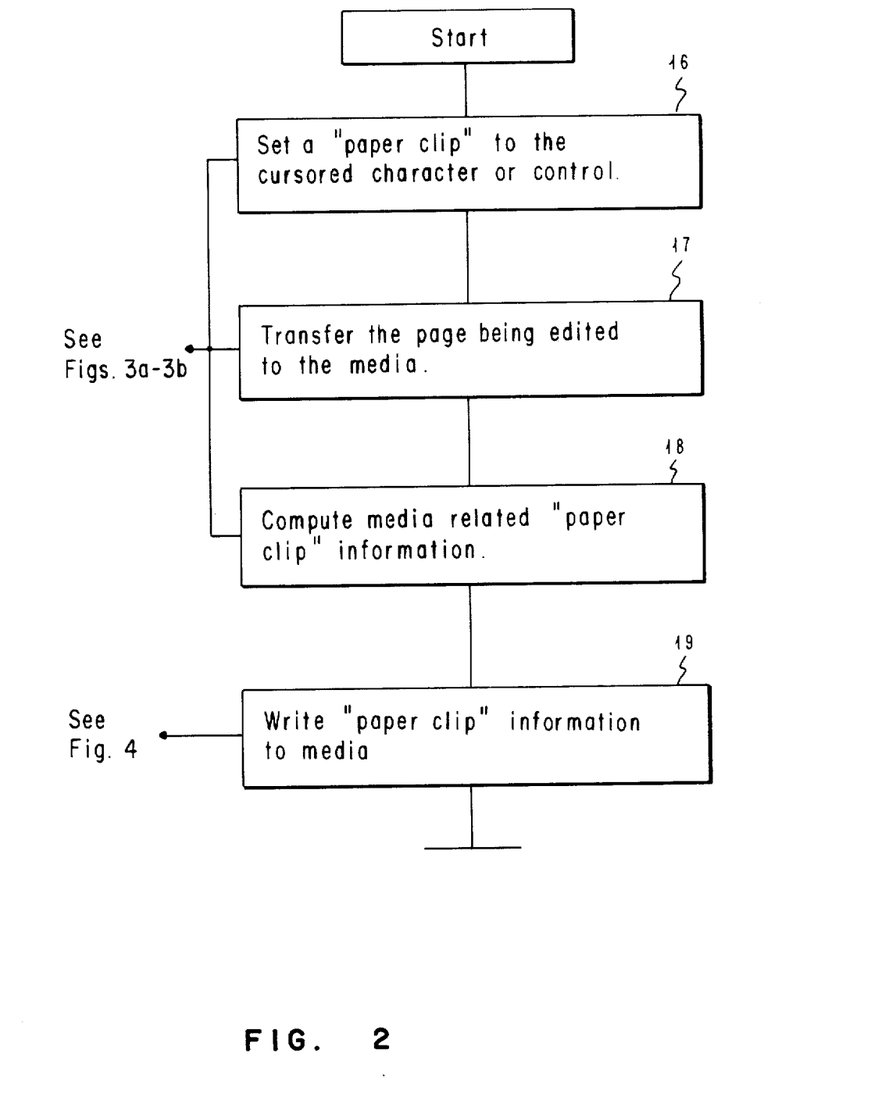
FIG. 2 is a flow chart of the operations which comprise the setting of the last revision location and the writing of this last revision location to the storage media on which the edited document is stored.

Reference is now made to FIG. 2 for an overview of the operations which comprise the setting of the "paper clip" and the writing of this pointer to the storage media on which the edited document is stored. While an operator is editing a document (either creating or revising), editing is typically terminated by the operator's specifying an "end" or "save" function. At that point the system performs the following steps as part of the edit termination process to determine the "paper-clip" information for the cursored character or control and store this information with the document on the storage media. At block 16 the "paper clip" pointer is set to the cursored character or control. Then at block 17 the page of the document being edited is transferred to the storage media. At block 18 the media related "paper clip" information is computed and at block 19 the media related "paper clip" information thus computed is written to the storage media in association with the document being edited. It will be remembered that the media related "paper clip" information includes, in addition to status flags, the offset within the record to the character or control, rather than the offset within the TSB to the character or control. Additionally, the media related "paper clip" information includes the number of the page which contains the cursor character or control as well as the number of the record within the document which contains this character or control.

Figure 3A:
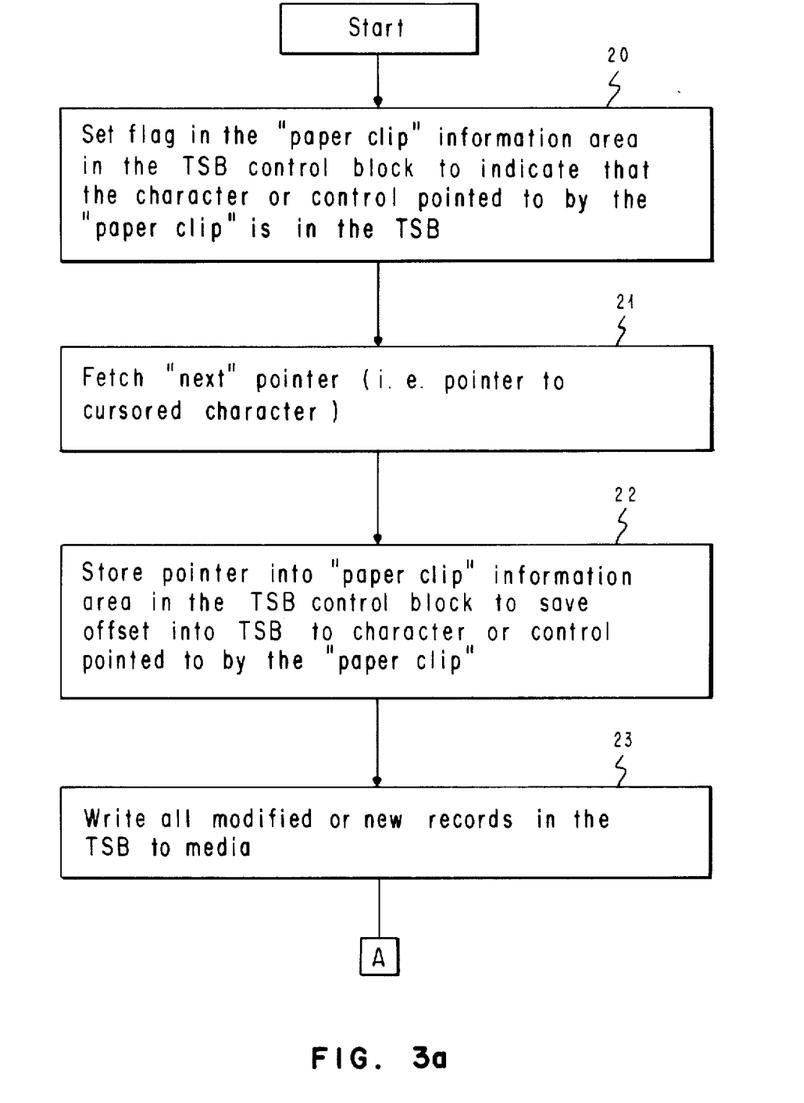
FIGS. 3a and 3b are a flow chart of the operations which comprise the setting of the last revision location.

Refer now to FIGS. 3a and 3b for a detailed flow chart of the operations relative to the setting of the "paper clip" pointer in blocks 16-18 of FIG. 2. At block 20 in FIG. 3a the system RAM contains a TSB control block for storing various types of information about the document being edited. A flag is set in the "paper clip" information area of this control block indicating that the character or control pointed to by the "paper clip" is in the TSB. At block 21 the pointer to the cursored character or control is fetched. At block 22 this pointer to the cursored character or control is stored in the "paper clip" information area in the TSB control block as the "paper clip" offset into the TSB. At block 23 all modified or new data relative to the document in the TSB is written to the storage media.

Figure 3B:
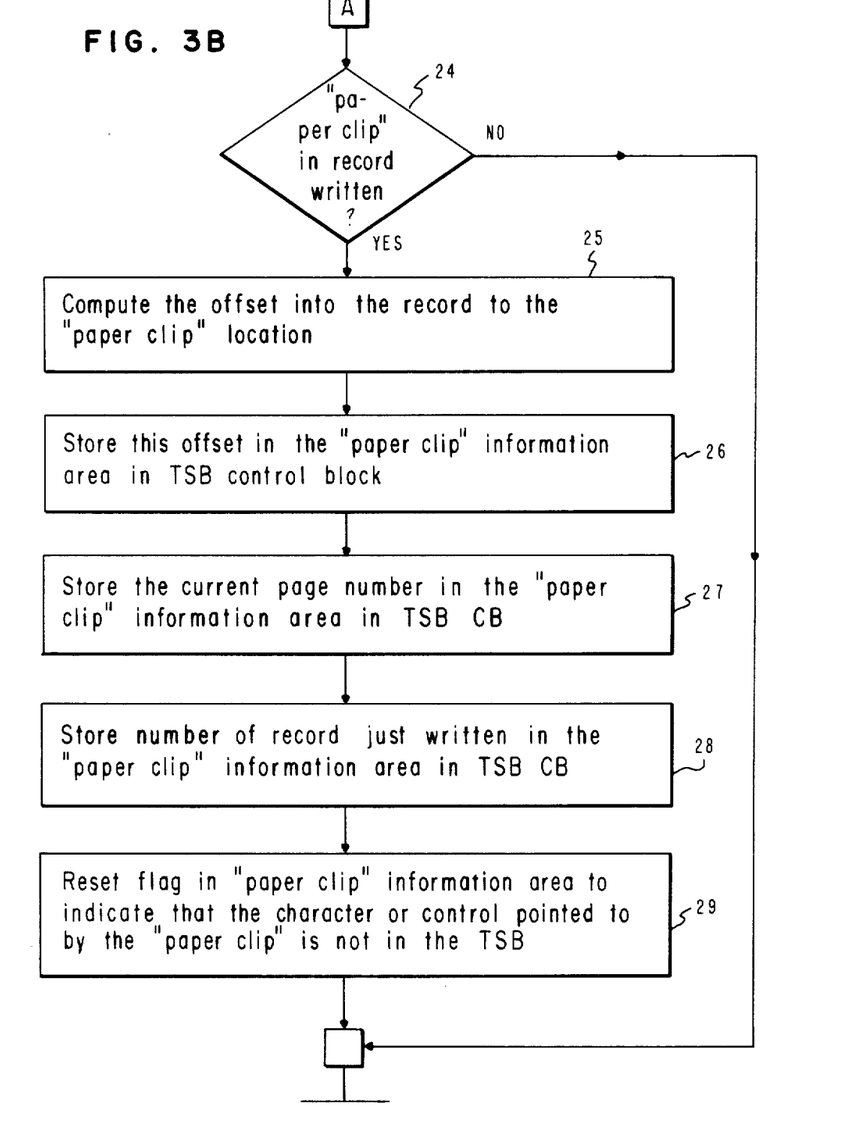

The operation continues at block 24, FIG. 3b. When the character or control pointed to by the TSB "paper clip" is in the record written to media, the operation proceeds to block 25 at which point the offset from the beginning of the record to the "paper clip" location is computed. At block 26 this offset is stored in the "paper clip" information area in the TSB control block. At block 27 the current page number of the document is stored in the "paper clip" information area in the TSB control block and at block 28 the number of the record written to the storage media is stored in the "paper clip" information area in the TSB control block. Finally, at block 29 the flag set at block 20 (FIG. 3a) is reset in the "paper clip" information area of the TSB control block. This indicates that the character or control pointed to by the "paper clip" is no longer in the TSB. With reference again to the decision at block 24, FIG. 3b, if the "paper clip" is not in the record just written to the storage media, the operations in blocks 25-29 are bypassed and writing of records continues until all records in the TSB have been written.

The following programming design language listing is another form of the description of the above technique of setting the "paper clip". The listing parallels the operation described above relative to FIGS. 3a and 3b.

```
Store offset into TSB to cursored character or
    control in "paper clip" information area in
    the TSB control block
Turn on status flag in "paper clip" information
    area in the TSB control block indicating
    that the character or control pointed to by
    the "paper clip" is contained within the TSB
Write records from the TSB to media
If the "paper clip" is in the record just
written, then
    Compute the offset into the record to the
        character or control pointed to by the
        "paper clip"
    Store this offset into the "paper clip"
        information area in the TSB control block
    Store the current page number into the
        "paper clip" information area as the
        number of the page containing the
        character or control to by the
        "paper clip"
    Store number of record just written as the
        number of the record containing the
        character or control to by the
        "paper clip"
    Reset flag in "paper clip" information area
        in the TSB control block to indicate that
        the character or control pointed to by the
        "paper clip" is not in the TSB
Endif
```

Figure 4:
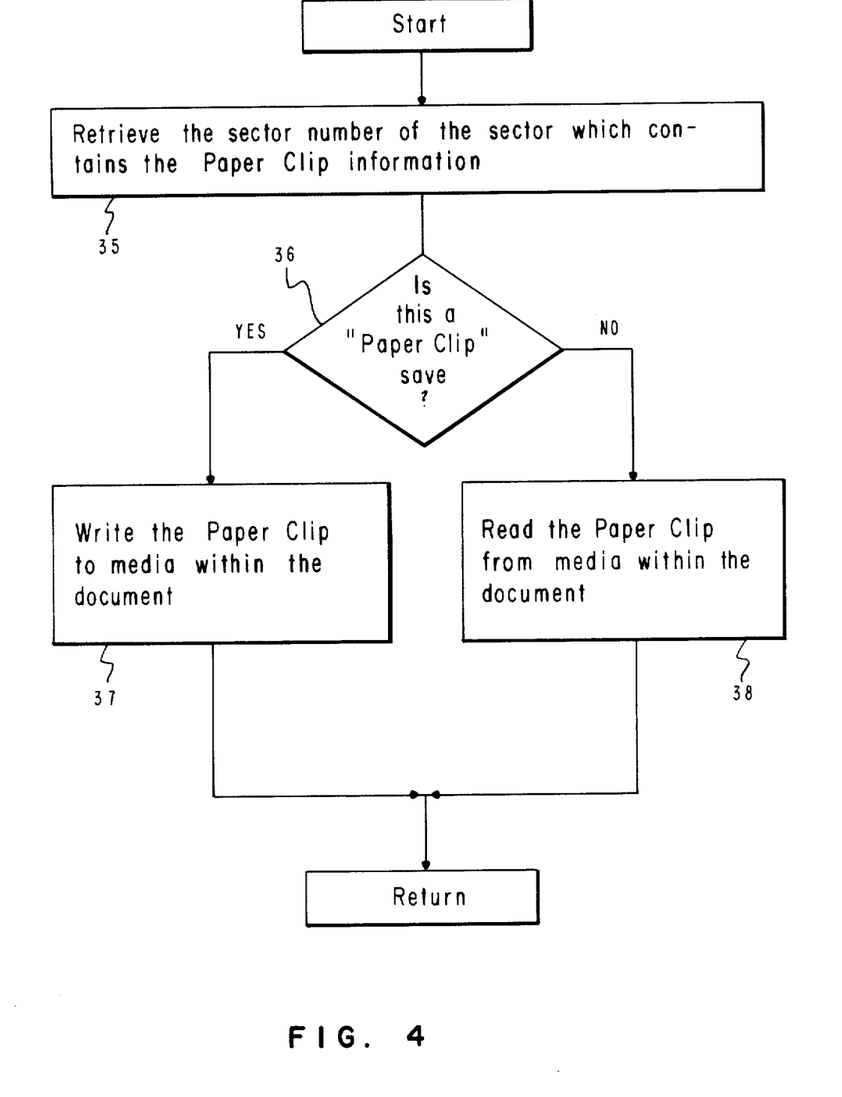
FIG. 4 is a flow chart of the operations which comprise the writing of the last revision location to the storage media on which the edited document is stored and retrieving this revision point from the storage media.

FIG. 4 is a detailed flow chart of the operations involved in writing the "paper clip" to the storage media and retrieving the "paper clip" from the storage media.

At block 35 a directory or index of the storage media sector numbers of which the document is comprised is consulted to retrieve the sector number of the sector which contains the "paper clip" information. At block 36, if the present operation is to write the "paper clip" to the storage media, the operation proceeds to block 37 at which time the "paper clip" information is written to the storage media within the document in the sector number retrieved at block 35. If this not a "paper clip" writing operation, then it is assumed at block 38 that the operation is to read the "paper clip" information from the storage media from the sector retrieved at block 35.

The following programming design language listing is another form of the description of the above technique of writing the "paper clip" information to the storage media to be stored with the document. The listing parallels the operation described above relative to FIG. 4.

---
Save/retrieve the Paper Clip within the document
   Fetch the sector number of the logical sector
      which contains the Paper Clip
   ... If the request is "save Paper Clip" then
      Write the revised Paper Clip to media
      within the document using the sector
      number that contains the Paper Clip
   ... Else (request must be "retrieve Paper Clip")
      Read the saved Paper Clip from media
      within the document using the sector
      number that contains the Paper Clip
   ... Endif
   Return to the Caller
---

In the preferred embodiment of this invention every document that has been created or revised contains a "paper clip". When a document is revised the system checks the status of this "paper clip" and the current setting of the "return to paper clip" option to determine whether the cursor should be at the beginning of the document or at the "paper clip" (i.e., last revision location) when the typing frame is first displayed to the operator for revision of the document.

Figure 5:
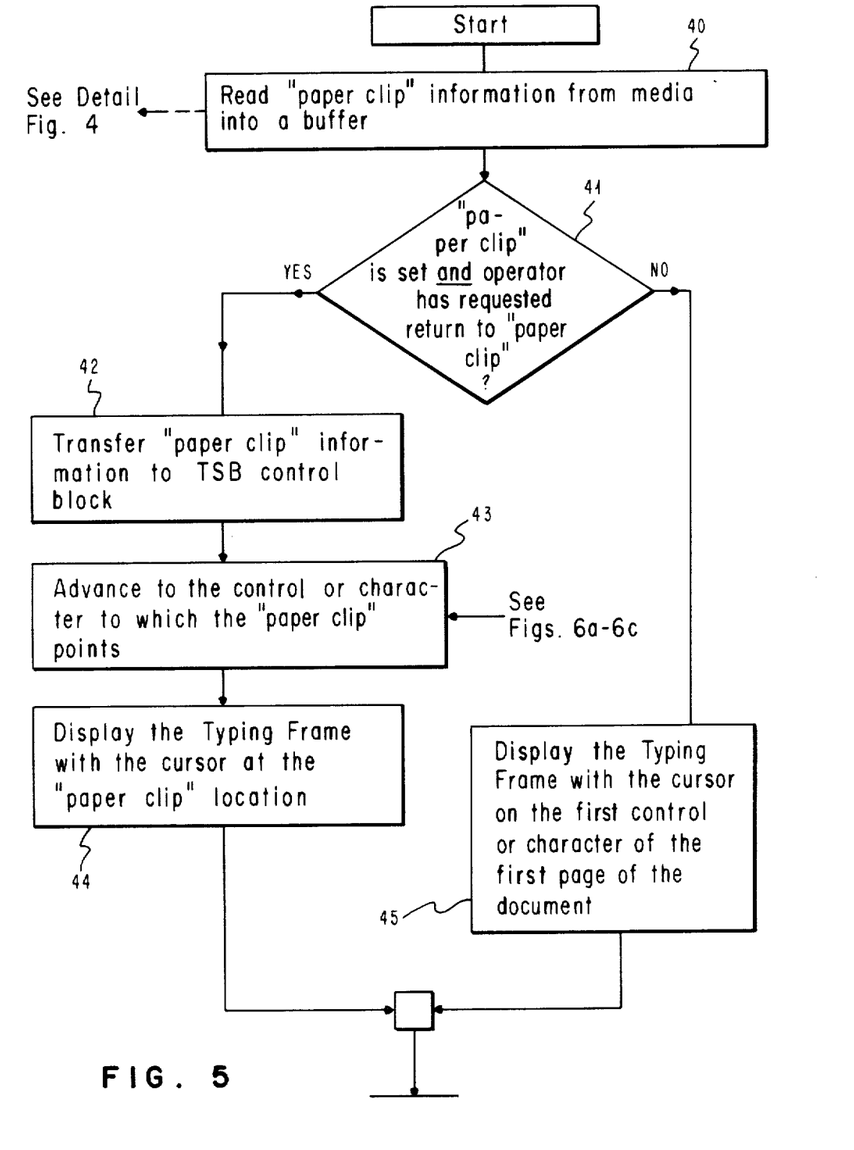
FIG. 5 is a flow chart of the operations which comprise the return to the last revision location.

Reference is now made to the flow chart of FIG. 5 which depicts the operations of returning to the "paper clip". At block 40 the "paper clip" information is read from the storage media into a buffer in the system random access memory. At block 41 if the "paper clip" is set and the operator has requested to "return to paper clip", at block 42 the "paper clip" information stored in the buffer at block 40 is written into the "paper clip" information area of the TSB control block. At block 43 the cursor location in a document is advanced to the control or character code to which the "paper clip" points, as will be described in detail relative to FIGS. 6a-6c. Then, at block 44 the typing frame with the cursor at the "paper clip" location is displayed to the operator so that editing can resume from the last revision location. At block 41, if either the "paper clip" is not set or the operator has not requested to "return to the paper clip" location then, at block 45 the document is displayed to the operator for further editing with the cursor on the first control or character of the first page of the document.

Figure 6A:
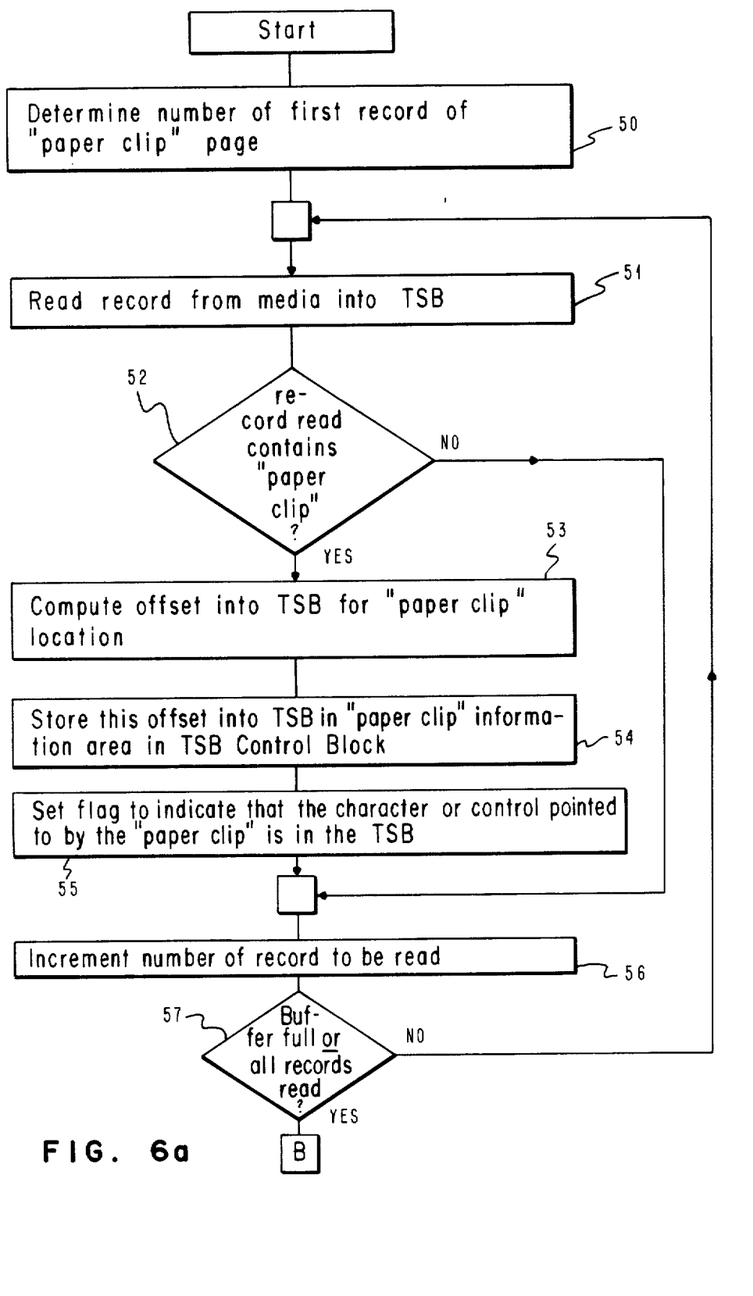
FIGS. 6a–6c are a flow chart of the operations which comprise the advance to the character or control which was the last revision location.

Refer now to FIG. 6a for a description of the operation at block 43, FIG. 5, of advancing in the document to the control or character to which the "paper clip" points. At block 50 the system determines the number of the first record of the page that contains the character or control pointed to by the "paper clip". At block 51 a record of the document is read from the storage media into the TSB. At block 52 if the record read contains the "paper clip" then the offset into the TSB for the "paper clip" location area is computed at block 53. At block 54 this offset into the TSB is stored in the "paper clip" information area in the TSB control block. Then at block 55 the flag is set in the "paper clip" information area of the TSB control block to indicate that the character or control pointed to by the "paper clip" is in the TSB. The operation then proceeds to block 56 where the number of the record to be read is incremented. At block 57 if the TSB is full or if all records of the page have been read the operation proceeds to block 58, FIG. 6b. If the TSB is not full or if all records of the page have not been read, the operation returns to block 51 whereupon another record is read from the storage media into the TSB.

Figure 6B:
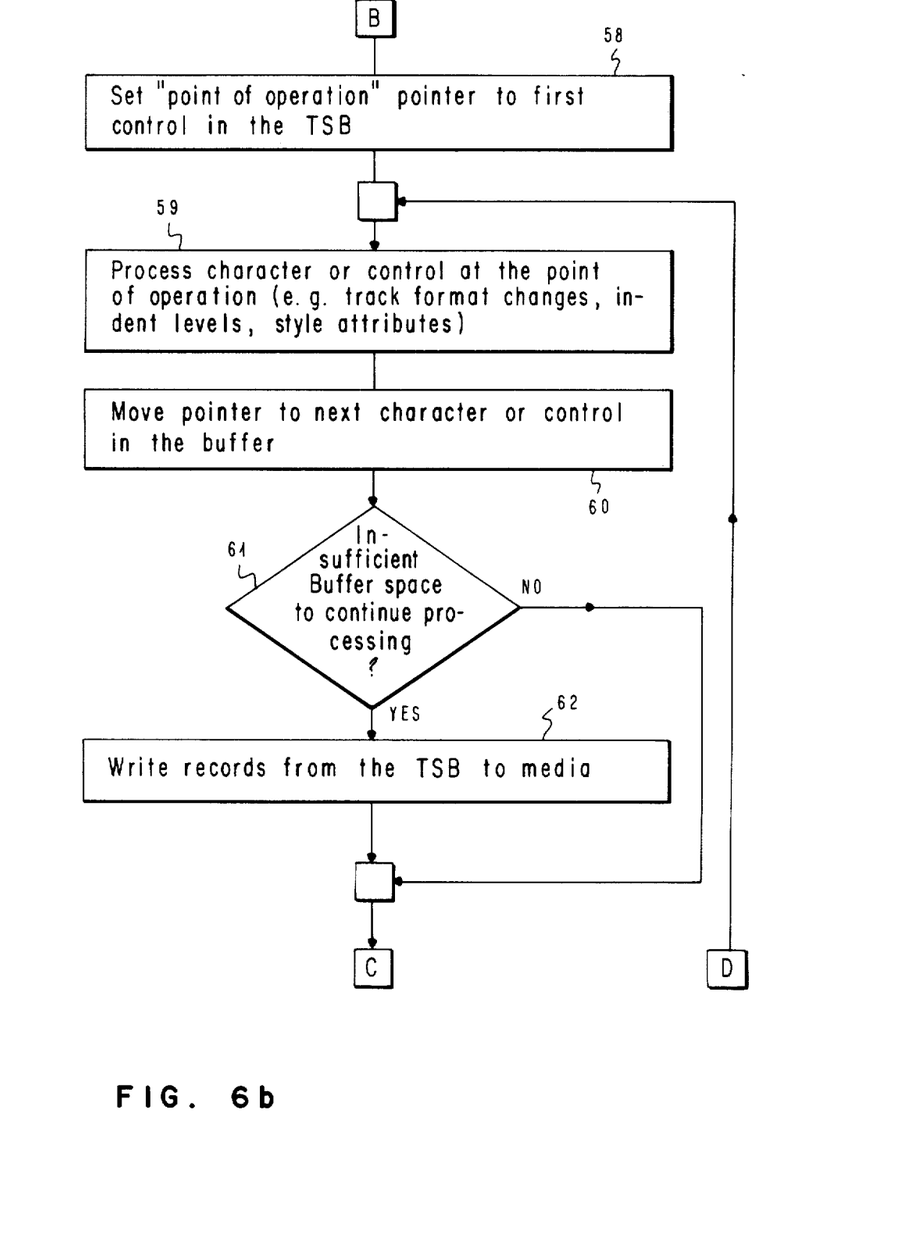

Continuing this operation in FIG. 6b, at block 58 a "point of operation" pointer is set to the first control in the TSB. At block 59 any required processing of the character or control at the point of operation is performed. Such processing might include the changing of format parameters such as an indent level or a style attribute as a result of detecting a control code specifying such a change at the point of operation. Next, at block 60 the TSB pointer is moved to address the next character or control in the TSB. At block 61 if insufficient TSB space exists to continue processing then records in the TSB are written from there to the storage media at block 62. If, after the test at block 61, there is sufficient buffer space to continue processing, or after records have been written at block 62, the operation proceeds to block 63, FIG. 6c, to determine whether the end of the TSB has been reached. If not the operation proceeds to block 69 to determine whether the control code or character to which the "paper clip" points has been reached. If so, the operation continues to block 44, FIG. 5, as described earlier. If not, the operation loops back to block 59, FIG. 6b, as described above.

Figure 6C:
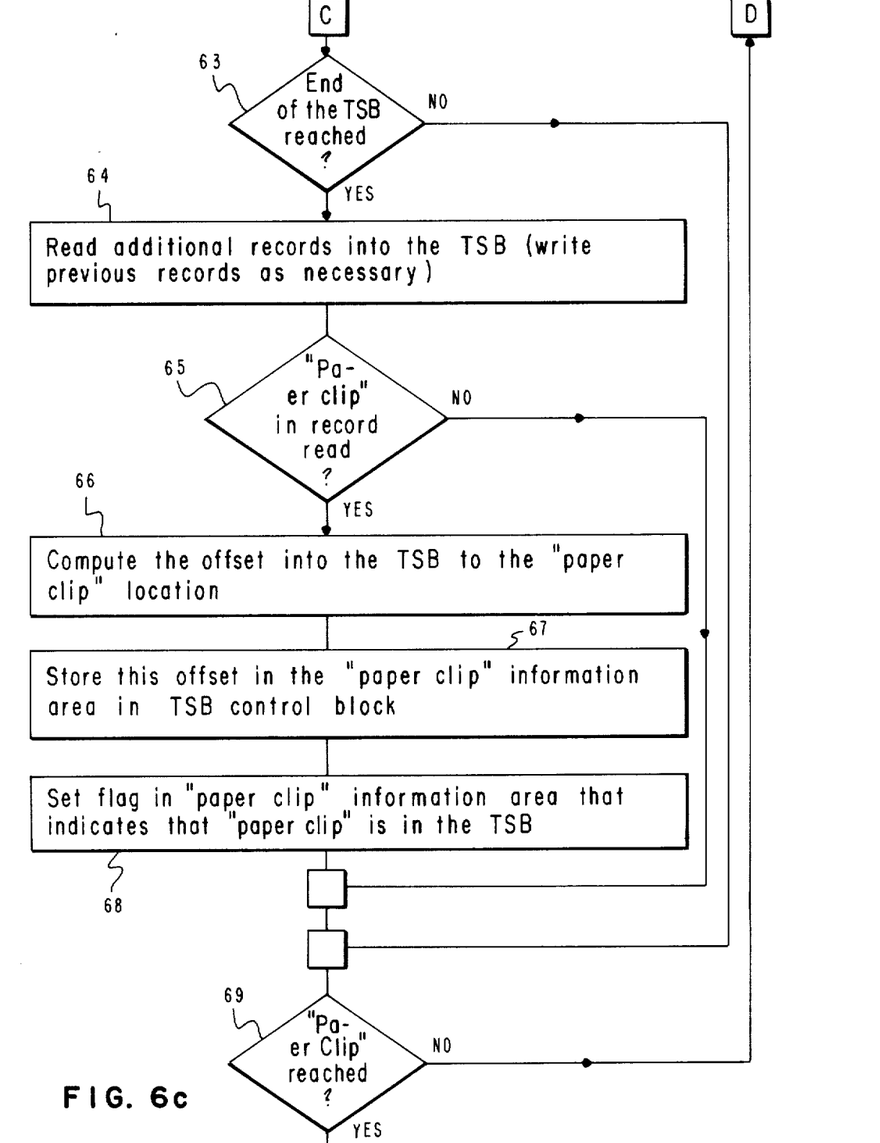

If, at block 63, FIG. 6c, the end of the TSB has been reached, then the operation proceeds to block 64 to read additional records from the storage media into the TSB. Previous records in the TSB are written to the storage media as necessary. At block 65 if the character or control code corresponding to the "paper clip" location is in a record just read into the TSB, at block 66 the offset to the "paper clip" location is computed and, at block 67 this offset is stored in the "paper clip" information area of the TSB control block. Thereafter, at block 68 the flag is set in the "paper clip" information area of the TSB control block which indicates that the "paper clip" location is currently in the TSB. Of course, at block 65 if the "paper clip" character or control code was not in the record read the operation proceeds directly from there to block 69.

The following programming design language listing is another form of the description of the above technique of advancing to the control code or character to which the "paper clip" points. The listing parallels the operation described above relative to FIGS. 6a-6c.

---
Determine the number of the first record of the
page that contains the character or control
pointed to by the "paper clip"
---

---
Read record from media into the TSB
---

```
            -continued
    If the character or control pointed to by the
    "paper clip" is in the record just read, then
        Compute the offset into the TSB for the
            "paper" location
        Store this offset into the "paper clip"
            information area in the TSB control
            block
        Set flag in "paper clip" information area
            in the TSB control block that indicates
            that the character or control pointed
            to by the "paper" is in the TSB
    Endif
    Increment number of record to be read
Enddo
```

Initialize "point of operation" pointer to the first control in the TSB until "point of operation" reaches the character or control pointed to by the "paper clip", do

```
    Process each character or control
    Move pointer to next character or control in
        the buffer
    If there is insufficient buffer space to
        continue processing, then
            Write records from the TSB to media
    Endif
    If the end of the TSB has been reached, then
        Read additional records from media into the
            TSB (writing previous records back to
            media as necessary)
        If the character or control pointed to by
            the "paper clip" is in the record just
            read, then
                Compute the offset into the TSB for
                    the "paper clip" location
                Store this offset into the "paper
                    clip" information area in the TSB
                    control block
                Set flag in "paper clip" information
                    area in the TSB control block that
                    indicates that the character or
                    control pointed to by the "paper
                    clip" location is in the TSB
        Endif
    Endif
Enddo
```

Although the "paper clip" is stored at the ending or saving of any job or revision thereof, the system will automatically reset the "paper clip" whenever an operation is called which performs a process on the entire document, such as pagination or spell checking. This allows the operator to keep a "return to paper clip" option set to "Yes" but still automatically return to the beginning of the document as would normally be desired after one of these processing operations to the entire document.

Figure 7:
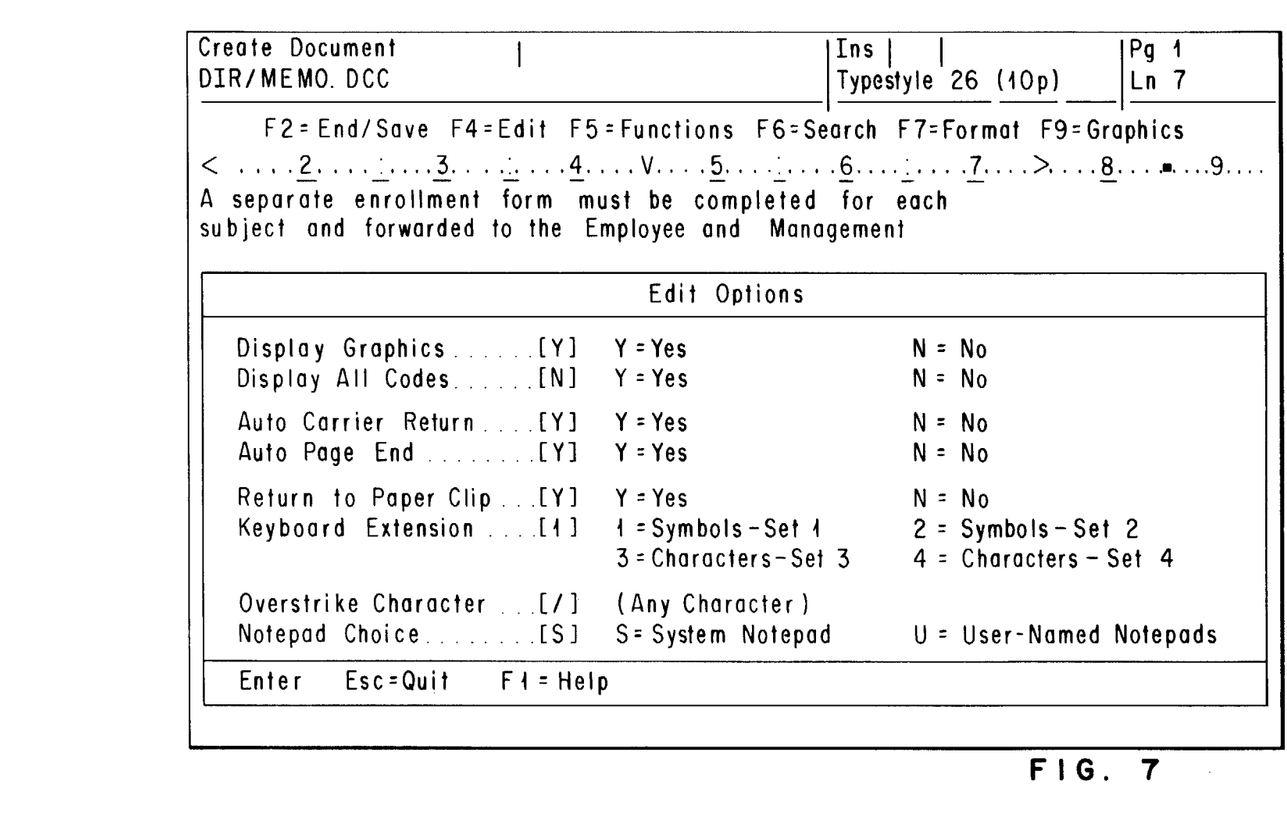
FIG. 7 is a typical edit options display panel for changing the option to return to the last revision location.

FIG. 7 shows a typical display panel of editing options. This panel can be brought to the display screen prior to ending a creation or revision operation with a document and the "Return to Paper Clip" option can be set to yes or no according to the operator's choice. Changing the "Return to Paper Clip" option in this panel allows the operator to temporarily override the profile option value.

Figure 8:
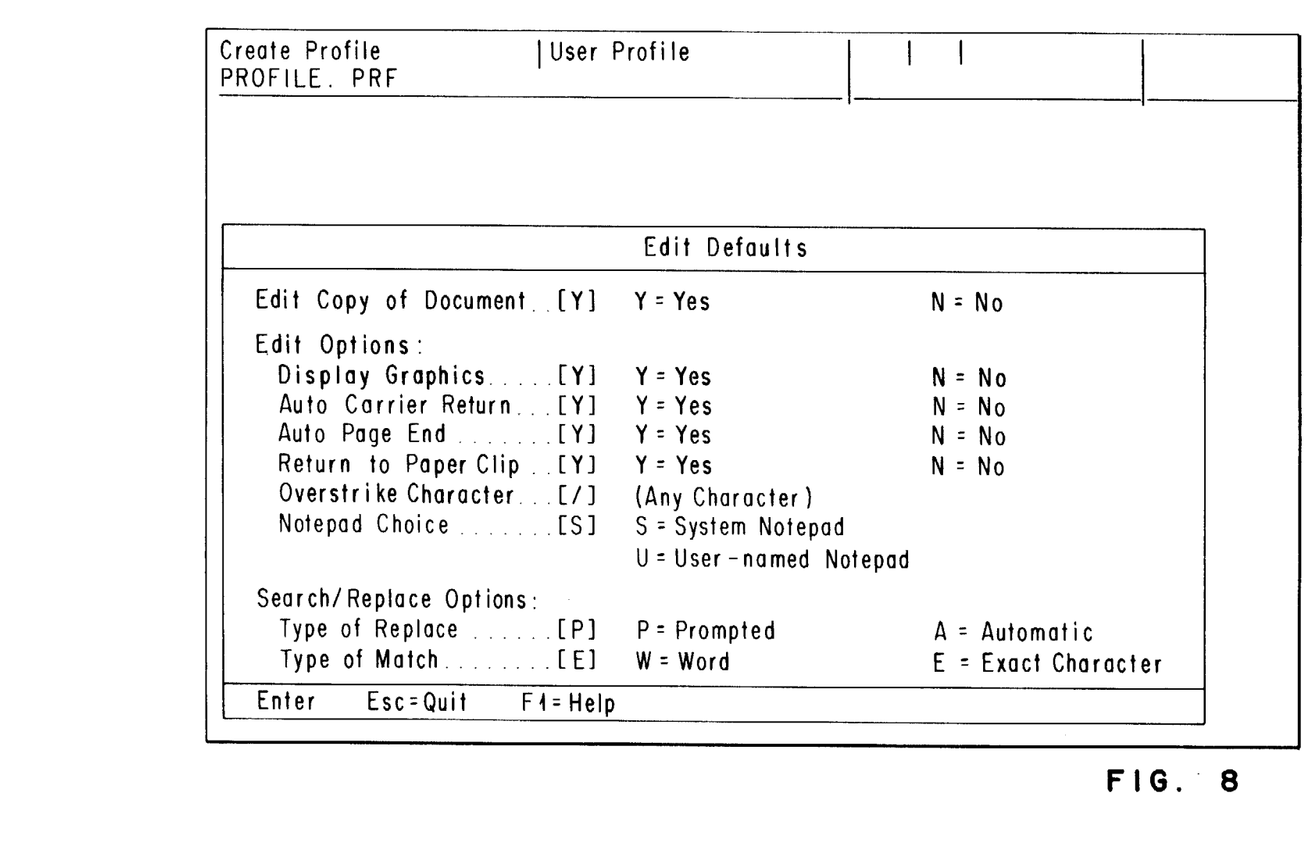
FIG. 8 is a typical profile display panel for changing the option to return to the last revision location.

The "Return to Paper Clip" option may be set and reset as a system profile option as depicted in the menu of FIG. 8. The system default for this option is "Yes". Normally an operator will create a document, perform many revision steps and then paginate or paginate and spell check the document. Using the default setting of "Yes" the system will operate as expected without the operator ever changing this option. Thus, when a document is revised, the system will return to the "paper clip" on each revision until the document is paginated or spell checked. With this default, the operator need not make a decision each time editing of a document is terminated.

In summary, a method has been described for use with a document editing application wherein a pointer to the cursor location is saved as a part of the document being edited. When document editing is resumed, the operator has the option to return to this saved, last revision point location. In an application program which uses this technique and allows for operator selected default settings in a profile related to system operation, the default setting can normally return the cursored character or control in the document to the point addressed at the end of the previous revision pass. The system can also be configured to ignore this point of last revision and return to the beginning of a document when an intervening process has occurred, such as pagination or spell checking, which affects the entire document.

While the invention has been shown and described with reference to particular embodiments thereof, it will be understood by those skilled in the art that the foregoing and other changes and details may be made therein without departing from the spirit and scope of the invention.

We claim:

1. A method of revising a document with a data processing system comprising:

storing with said document on a computer storage media a location of a smallest revisable entity addressed for revision at the end of a first revision pass;

selecting a default data processing system mode of operation which ordinarily causes said system to automatically return to the beginning of said document on a succeeding revision pass; and returning automatically to said location of said smallest revisable entity addressed for revision in said document on a succeeding revision pass instead of returning to the beginning of said document by said data processing system in response to selection by an operator of a return to last revision point mode of operation.

2. The method of claim 1 wherein said location stored on said computer storage media of said smallest revisable entity addressed for revision comprises a record number within said document which contains a character or control code at said location of said smallest revisable entity addressed for revision and an offset within said record to said character or control code.

3. A method of revising a document with a data processing system comprising:

storing with said document on a computer storage media a location of a smallest revisable entity addressed for revision at the end of a first revision pass;

selecting a default data processing system mode of operation which ordinarily causes said system to automatically return to said location of said smallest revisable entity addressed for revision on a succeeding revision pass; and returning automatically to said beginning of said document on a succeeding revision pass instead of returning to said location of said smallest revisable entity addressed for revision of said document by said data processing system in response to selection by an operator of a return to the beginning of the document mode of operation.

4. A method of revising a document with a data processing system comprising:

storing with said document on a computer storage media a location of a smallest revisable entity addressed for revision at the end of a first revision pass;

selecting a default data processing system mode of operation which ordinarily causes said system to automatically return to said location of said smallest revisable entity addressed for revision on a succeeding revision pass; and returning automatically to said beginning of said document on a succeeding revision pass instead of returning to said location of said smallest revisable entity addressed for revision of said document by said data processing system in response to processing of a task which affects the entirety of said document.

5. The method of claim 4 wherein said task is a pagination task performed by said data processing system.

6. The method of claim 4 wherein said task is a spell checking task performed by said data processing system.

* * * * *

UNITED STATES PATENT AND TRADEMARK OFFICE
CERTIFICATE OF CORRECTION

PATENT NO. : 4,827,447

DATED : May 2, 1989

INVENTOR(S) : Rosimbo E. Croes, Alice V. Gentry, Milton L. Gentry, Jr., and Melvin R. Kendrick It is certified that error appears in the above-identified patent and that said Letters Patent is hereby corrected as shown below:

Title Page Item [54]  last line of the title, please delete "EDITION" and insert --EDITING--.

Signed and Sealed this

Twenty-second Day of June, 1993

Attest:

MICHAEL K. KIRK

*Attesting Officer*     Acting Commissioner of Patents and Trademarks